April 23, 1963     M. A. DE CORTE     3,086,541
BREAK POINT FLUID PRESSURE GOVERNOR MECHANISM
Filed July 1, 1960
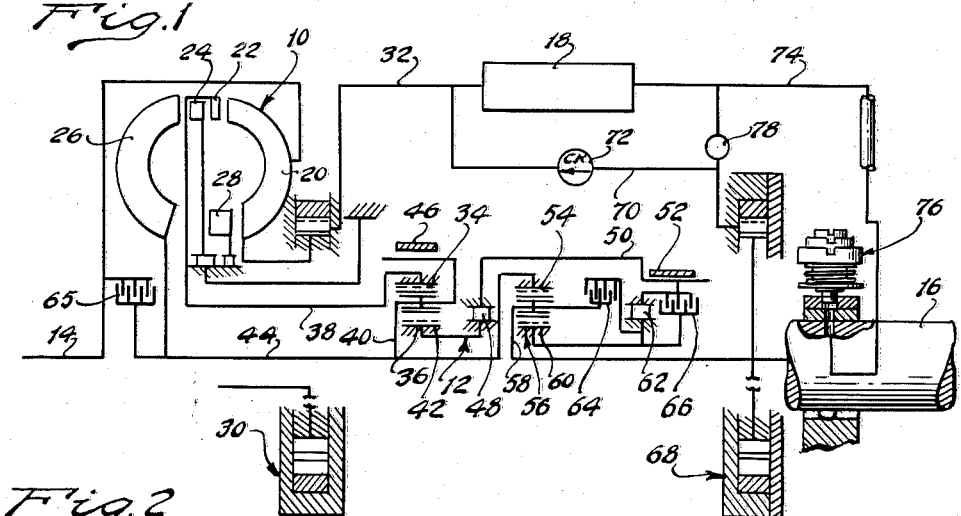
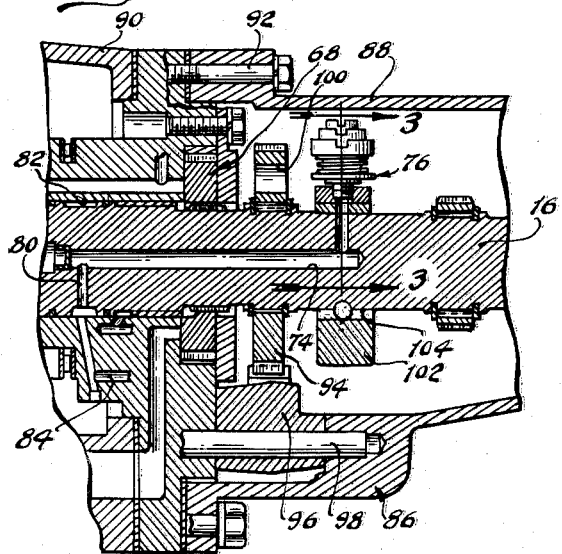
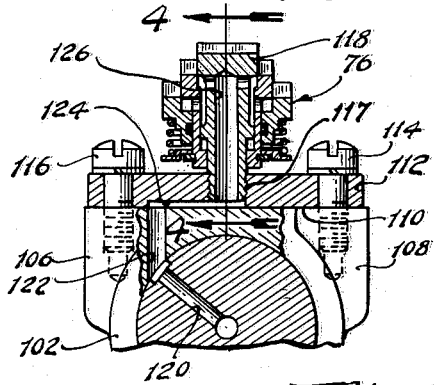
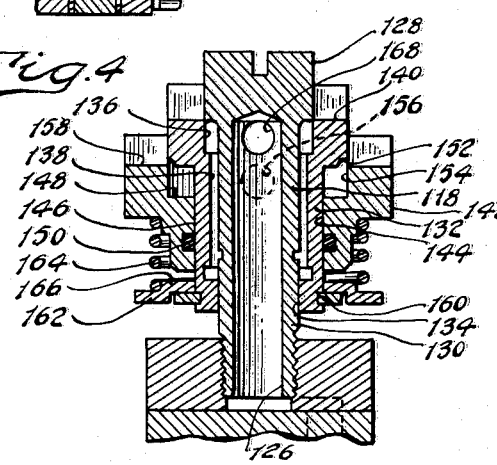
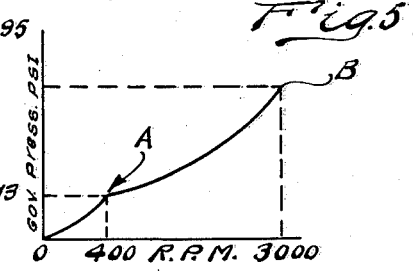
INVENTOR.
MICHAEL A. DE CORTE
BY
ATTORNEYS.

United States Patent Office

3,086,541
Patented Apr. 23, 1963

3,086,541
BREAK POINT FLUID PRESSURE GOVERNOR MECHANISM
Michael Angelo De Corte, Scottsdale, Ariz., assignor to Ford Motor Company, Dearborn, Mich., a corporation of Delaware
Filed July 1, 1960, Ser. No. 40,215
13 Claims. (Cl. 137—56)

My invention relates generally to automatic control mechanisms, and more particularly to a fluid pressure governor capable of being used as a speed indicator.

My invention finds particular utility in control circuits for automotive type multiple speed power transmission mechanisms. Such control circuits are capable of conditioning the transmission mechanism for speed ratio changes in response to variations in operating variables such as the input torque and the driven speed of the power output member. The governor of my instant invention is capable of producing a reliable speed pressure signal that may be used by such a control circuit for control purposes.

In the copending application of Robert O. Dameron, Serial No. 683,830, now Patent No. 2,973,670, which is assigned to the assignee of my instant invention, there is disclosed a simplified governor for an automatic power transmission mechanism. This governor is capable of establishing a speed signal that is proportional in magnitude to vehicle speed, and it acts in cooperation with a fluid pressure pump driven by the transmission power output member.

The governor of the above mentioned copending application may be appropriately termed a single stage governor since its regulating characteristics remain unchanged throughout the entire operating speed range.

The improved governor of my instant invention embodies many of the improvements of the design disclosed in the aforementioned copending application, and it is further characterized by a double stage mode of operation. During operation at relatively reduced operating speeds, the sensitivity of the governor is greater than it is during operation at relatively high speeds. The rate of change in the magnitude of the governor pressure signal during acceleration and deceleration at low road speeds is greater than the corresponding rate of change during operation at higher road speeds.

The two stage action of my instant governor is of advantage in multiple speed radio power transmission mechanism that are capable of two or more speed ratio changes during normal forward driving operation. One shift valve or pressure distributor valve may be employed for initiating a speed ratio change from a low speed ratio to an intermediate speed ratio, and a second shift valve may be used for initiating a subsequent shift to a high speed ratio. My improved governor is adapted to provide a valve actuating speed signal for the first shift valve while the governor is operating in a low speed range and to provide a separate valve actuating speed signal for the second shift valve during operation in the high speed range. In this way the governor can provide an optimum speed signal pressure level for each speed ratio shift thereby contributing to an improvement in the shift quality.

I am aware of various types of two stage governor designs of conventional construction. These governor designs normally include metering valve elements that are responsive to centrifugal forces and opposed fluid pressure forces. Means are provided for either altering the centrifugal force distribution in the governor valve assembly or adjusting the effective area on which the governor pressure is caused to act, and these alterations occur at an intermediate speed range so that the characteristics of the governor mechanism during operation at low speeds will be more sensitive than the corresponding characteristics during operation at higher speeds.

In my instant invention an adjustment in the metering characteristics of the governor valve assembly is accomplished by making provision for a change in the metering capacity of the valve elements of the mechanism when the magnitude of the governor pressure reaches a desired intermediate value. The metering capacity of the mechanism is greater during operation at higher speeds than it is during operation at lower speeds, and the effective centrifugal mass is reduced during operation at higher speeds. The mechanism is therefore more sensitive during operation at lower speeds than during operation at higher speeds.

The provision of an improved governor valve mechanism of the type above described being a principal object of my invention, it is a further object of my invention to provide a governor mechanism capable of establishing a pressure signal that is proportional in magnitude to the speed of rotation of a rotary member, and which acts in cooperation with a fluid pressure pump drivably connected to the rotary member so that the effective discharge pressure of the pump may be used as an indicator of speed.

It is a further object of my invention to provide an assembly of the type above set forth wherein a precalibrated flow restricting orifice is situated between the discharge side of the pump and the metering elements of the governor mechanism, said metering elements providing a controlled degree of communication between the downstream side of the precalibrated orifice and an exhaust region.

It is a further object of my invention to provide an assembly of the type set forth in the preceding object wherein the metering elements are capable of establishing a controlled degree of communication between the downstream side of the orifice and the exhaust region during operation in the low speed range and to provide an increased degree of communication between the downstream side of the orifice and the exhaust region during operation in a higher speed range.

It is a further object of my invention to provide a governor mechanism of the type above set forth and which is characterized further by its simplified construction. I contemplate that my governor may be readily adapted to be used with control circuits of known construction with a minimum amount of alteration being required to incorporate the same into such control circuits.

It is a further object of my invention to provide a governor mechanism of the type above set forth and which includes metering valve elements that are centrifugally responsive, and wherein the centrifugal forces acting on the valve elements are of a relatively high order of magnitude.

For the purpose of particularly describing the improvements of my instant invention, reference will be made to the accompanying drawings wherein:

FIGURE 1 shows in schematic form of one of several multiple speed power transmission mechanisms capable of embodying the improved governor mechanism of my invention.

FIGURE 2 is a cross sectional view of a portion of a transmission mechanism schematically illustrated in FIGURE 1.

FIGURE 3 is a transverse cross sectional view of my governor mechanism and is taken along section lines 3—3 of FIGURE 2.

FIGURE 4 is an enlarged cross sectional view of the governor mechanism illustrated in FIGURE 3, and FIGURE 5 is a graphical representation of the operating characteristics of my improved governor mechanism.

Referring first to FIGURE 1, numeral 10 generally designates a hydrokinetic torque converter unit and numeral 12 generally designates a pair of planetary gears acting in cooperation with the converter unit 10. Numeral 14 designates a power input shaft and numeral 16 designates a power output or driven shaft. An automatic control mechanism is generally designated by numeral 18.

The torque converter unit 10 includes a pump 20, a first turbine 22, a first reactor 24, a second turbine 26 and a second reactor 28. The turbines 22 and 26 and the reactors 24 and 28 are disposed in toroidal fluid flow relationship in a hydrokinetic circuit. The pump 20 is drivably connected to power input shaft 14, and is capable of establishing fluid circulation in the hydrokinetic circuit to impart a driving torque to the turbines 22 and 26 in a known fashion. The pump 20 is connected also to a front pump 30 that is capable of providing a control circuit pressure for the control mechanism 18. The discharge side of the pump 30 is in fluid communication with the control mechanism 18 through a passage 32.

The first turbine 22 is coupled drivably to a ring gear 36 for one of the planetary gear units 12, a suitable sleeve shaft 38 being provided for this purpose. The gear unit 36 further includes a carrier 40 on which is journaled a plurality of planet gears which drivably engage a ring gear 34 and a sun gear 42. Carrier 40 is connected to a central shaft 44 which in turn is coupled to the second turbine 26. The carrier may be braked selectively by means of a brake band, schematically shown at 46.

The sun gear 42 for the gear unit 36 may be anchored by means of an overrunning brake 48 to a brake drum 50. The brake drum 50 in turn is adapted to be selectively braked by means of brake band 52.

The shaft 44 is also connected to the ring gear 54 for a second of a pair of planetary gear units 12, said gear units being generally identified by reference character 56. The gear unit 56 further includes a carrier 58 that is connected to power output shaft 16. The carrier is adapted to rotatably journal planet pinions which drivably engage ring gear 54 and a sun gear 60, the latter being adapted to be anchored by means of an overrunning brake 62 to the aforementioned brake drum 50.

A high-speed lockup clutch, shown at 64, is adapted to condition the power transmission mechanism for operation in a high speed ratio. A direct drive lockup clutch is shown at 65. Operation of clutches 64 and 65 may each be controlled by a separate shift valve in the control circuit. A reverse clutch 66 is situated between brake drum 50 and sun gear 60 so that a reverse torque may be imparted to the latter during reverse drive operation.

A rear pump 68 is drivably connected to the driven shaft 16. The pump 68 may be a positive displacement gear pump or a positive displacement vane pump, although I contemplate that other forms of pumps may also be used for this purpose.

The discharge side of pump 68 is in fluid communication with passage 32 and the control mechanism 18 through a passage 70. A one-way check valve 72 is situated in passage 70 to prevent transfer of control pressure from the rear pump 68 to the control mechanism 18. In those instances when the front pump 30 is inoperative, pump 68 will supply control pressure requirements of the mechanism 18. During normal driving operation, however, the discharge pressure of the pump 30 is greater than the discharge pressure of pump 68, and check valve 72 will in this instance assume a closed position. The front pump 30 will therefore supply the full pressure requirements for the mechanism 18 whenever the vehicle engine is operating.

Passage 70 and the discharge side of pump 68 are in fluid communication with a passage 74 that extends to a governor valve mechanism 76. A precalibrated orifice 78 is situated on the discharge side of pump 68, and the passage 74 communicates with the downstream side of the orifice 78.

During normal forward driving operation, the engine delivers power to power input shaft 14, and this causes a driving torque to be imparted to the first turbine 22. During low speed ratio operation, the magnitude of the torque applied to turbine 22 is substantially greater than the torque applied to second turbine 26. During such low speed ratio operation the turbine torque of the first turbine 22 is transmitted to the ring gear 34, and the sun gear 42 functions as a reaction member. Sun gear 42 is anchored by the overrunning brake 44 and the brake band 52. Brake band 52 is applied during normal forward driving operation.

When the speed ratio for the converter unit 10 increases, the magnitude of the torque applied to the second turbine 26 becomes greater than the torque applied to turbine 22. When the magnitude of the torque applied to turbine 26 is of a sufficient magnitude, the reaction of the sun gear 42 ceases and the overrunning brake 48 will permit the sun gear to overrun. The full turbine torque on turbine 26 is thereafter transmitted directly to the ring gear 54 for the gear unit 56. The gear unit 56 therefore functions as the sole means for multiplying the effective turbine torque of converter unit 10. During those instances in which the first turbine 22 functions as a driving member, the torque of the turbine 22 is multiplied by both of the gear units 36 and 56.

The reaction of the sun gear 60 is transmitted through overrunning brake 62 to deenergize brake band 52. The carrier 58 functions as a power output member in this instance and the driven shaft 16 rotates in unison with the carrier 58.

To establish high speed operation, clutch 64 is engaged by pressurizing an associated clutch servo, and this locks the gear unit 56 together for rotation in unison. The turbine 26 is therefore effective to power driven shaft 16, and the gear units 36 and 56 are inoperative. A direct drive is obtained by energizing a servo for clutch 65.

The above described speed changes in the converter unit and the planetary gear units take place during acceleration of the vehicle from a standing start to normal cruising conditions. During this time the pump 68 is driven at a progressively increasing speed and the discharge pressure of the pump 68 is transmitted through the orifice 78. The pressure which is made available to the governor valve mechanism 76 is therefore of a lesser magnitude than the discharge pressure which exists in passage 70. This is due to the fluid flow restriction of the orifice 78.

Referring next to FIGURE 2, the passage 74 described with reference to FIGURE 1 is in the form of an axial bore formed in the driven shaft 16. Passage 74 communicates with a radial passage 80 extending to a groove 82 in shaft 16. Groove 82 is in turn in communication with internal passage structure shown in part at 84, said passage structure establishing communication with the discharge side of pump 68.

A portion of the transmission housing is generally identified by reference character 86, and it includes a tailshaft extension housing portion 88 and a main housing portion 90, said housing portions 88 and 90 being secured together by suitable bolts 92. The housing portion 90 provides a suitable bearing support for the power output shaft 16.

A parking gear is shown at 94 and it is splined or otherwise secured to power output shaft 16 within the extension housing portion 88. A pawl 96 is journaled within the extension housing 88 by means of a suitable rocker shaft 98. When the pawl 96 engages the teeth of gear 94, the shaft 16 is locked to the stationary housing.

The gear 94 can be situated adjacent the governor valve mechanism 76, the latter being secured to shaft 16 by a driving key or by any other suitable connecting means. In order to assist in the dynamic balancing of shaft 16, the gear 94 can be recessed or apertured as shown at 100. This aperture 100 can be situated directly adjacent the location of the center of mass for the governor valve mechanism 76.

In order to assist further in the counterbalancing of the governor valve mechanism 76, the governor valve mechanism is secured by suitable clamping bolts to a counterweight casting 102. Casting 102 is formed with an opening 104 through which shaft 16 extends. The center of mass for the casting 102 is situated on the side of the axis of shaft 16 which is opposite to the location of the governor valve mechanism 76.

Referring next to FIGURE 3, the counterweight casting 102 is formed with shoulders 106 and 108. These shoulders are formed with a flat surface 110 on which is bolted a supporting plate 112, suitable bolts 114 and 116 being provided for this purpose. The plate 112 is formed with a central threaded opening 117 in which is received threadably a valve member 118 of the governor valve mechanism 76. The member 118 forms a support for the remaining portions of the valve mechanism.

Passage 74 in the shaft 16 communicates with a radial passage 120 which in turn extends to a communicating passage 122 formed in the counterweight casting 102. Passage 122 communicates with a recess 124 in the plate 112, said recess providing communication between passage 122 and a radially extending passage 126 formed in the valve member 118.

Referring next to FIGURE 4, the construction of the governor valve mechanism 76 is shown in more particular detail. It will be seen from an inspection of FIGURE 4 that the above described valve member 118 is formed with two circular valve lands 128 and 130, said lands being situated at radially spaced locations.

A circular valve member 132 is received telescopically over valve member 118 and it is formed with internal circular valve lands 134 and 136. The valve lands 134 and 136 slidably cooperate with the aforementioned external valve lands 130 and 128, respectively. The cooperating valve members 132 and 118 define therebetween an annular passageway 138, said passageway extending from the valve land 134 to an edge 140 on the valve land 136. The edge 140 is formed by a transverse recess in the radially outward end of the valve member 132.

A third valve member 142 is received telescopically over valve member 132 and it is formed with an elongated internal sealing surface 144. The outer cylindrical surface of valve member 132 also forms a sealing surface 146 which cooperates with the sealing surface 144 to form an effective seal between a chamber 148 and the exterior exhaust region. If desired, a sealing ring 150 can be situated in valve member 142 in an appropriate sealing ring groove in order to establish a more positive seal between the members 132 and 142.

The aforementioned chamber 148 is defined by the cooperating valve members 132 and 142, and communication between chamber 148 and the external exhaust region is controlled by cooperating valve lands 152 and 154 formed on the valve members 132 and 142, respectively. Fluid communication between the chamber 148 and the aforementioned annular passage 138 is established by means of one or more ports 156 formed in the valve member 132. The valve land 154 terminates at an edge 158 which is formed by means of a transverse opening formed in the radially outward end of valve member 142.

The radially inward end of valve member 132 is formed with a groove 160 within which is positioned a snap ring for spring seat 162. A compression spring 164 is situated between seat 162 and the valve member 142 and it is effective to urge the latter in a radially outward direction with respect to valve member 132. If desired, a spacer 166 can be located on the spring seat 162 in order to center appropriately the spring 164. During those instances in which the driven shaft 16 is stationary, the pump 68 is incapable of supplying a pressure to the governor valve mechanism and the spring 164 in this instance will urge the valve member 142 in a radially outward direction until the valve lands 154 and 152 assume a fully closed position, thereby interrupting communication between chamber 148 and the external exhaust region.

It is apparent from the foregoing that I have provided a governor mechanism of rather simplified construction and which requires only a single fluid pressure passage extending from the rear pump 68 to the governor valve mechanism 76. In certain prior art fluid pressure governor mechanisms that are used in the automotive transmission field, a compound valve system is employed and a fluid pressure manifold and communicating pressure distributor passages are formed in the surrounding transmission structure in order to distribute a control pressure to the valve mechanism. Separate internal passage means must be incorporated in the surrounding transmission structure in conventional designs as part of the aforementioned manifold in order to provide a fluid flow path for distributing the regulated pressure made available by the cooperating valve elements of the mechanism so that it can be distributed appropriately to the transmission controls. In addition, a third passage means is provided for establishing an exhaust flow path between an exhaust port and the pressure regulating valve elements of the mechanism.

In my improved structure the above described complex passage structure is not necessary, and a pressure signal can be made available to the control mechanism 18 without the necessity for providing fluid pressure delivery and return passages extending to and from the mechanism 76.

It is also apparent from the foregoing that the magnitude of the centrifugal forces are of a relatively high degree. This is due to the fact that the centrifugal response of the valve structure of the mechanism 76 during operation in the lower speed range is obtained as a result of the combined masses of the valve members 142 and 132. Further, the relatively large centrifugal mass of the valve member is available during operation in the higher speed range.

For the purpose of setting forth a summary of the operation of my invention, it will be assumed that the driven shaft 16 is accelerated from a standing start to a relatively high operating speed; i.e., 3000 r.p.m.

When the driven shaft 16 is stationary, the valve land 154 will be telescopically received over valve land 152 by reason of the action of spring 164. When the vehicle begins to move, the rotation of driven shaft 16 will establish a driving motion of pump 68, and passage 74 will become pressurized. Pressure is distributed through passage 74 and through radial passage 122 to recess 124, the latter being in communication with radial passage 126 in the valve member 118.

One or more ports 168 are formed in valve member 118 to establish communication between passage 126 and the passage 138. The pressure which is distributed to passage 126 by the pump 68 therefore acts on the valve member 132 to urge the latter in a radially inward direction with respect to valve member 118. The effective area on which this pressure acts is equal to the difference in the cross sectional area of valve land 128 and the sealing surface 134. This pressure force is opposed and balanced by the centrifugal forces due to the combined masses of valve members 132 and 142.

When the shaft 16 is rotated, the centrifugal forces acting on the valve members 132 and 142 will urge these valve elements radially outward and restrict the degree of communication between passage 138 and the exhaust region. This creates a back-pressure in passage 126, and the magnitude of this back-pressure is dependent upon the degree of communication established by the valve lands 136 and 128.

When the speed of shaft 16 increases still further, the centrifugal forces acting on valve elements 132 and 142 increase, and this tends to decrease the degree of communication between passage 138 and the exhaust region that is made available by the cooperating valve lands 136 and 128. This results in a still further increase in back-pressure in passage 126, and the magnitude of this back-pressure is an indicator of the speed of rotation of shaft 16.

This back-pressure is made available to passage 74 and to the control mechanism 18 and is utilized by the latter as a signal for initiating the various speed ratio shifts discussed earlier. These shifts are established by appropriately distributing control pressure to the aforedescribed transmission servos.

Referring next to FIGURE 5, the pressure that is made available in this fashion to passage 74 and control mechanism 18 is indicated on the ordinate, and the speed of rotation of shaft 16 is indicated on the abscissa. The relationship between these two variables is represented by the curve that extends between points O and A and by the curve extending between points A and B. It is apparent that the slope of line O—A is relatively great in comparison to the slope of the high speed range between points A and B. This indicates that the governor is relatively sensitive in the low speed range to changes in vehicle speed.

When the speed of driven shaft 16 approaches approximately 400 r.p.m., the magnitude of the governor pressure is of sufficient magnitude to urge the valve member 142 in a radially inward direction against the opposing force of spring 164. The back-pressure created by the cooperating valve lands 136 and 128 is distributed to the chamber 148 through passage 156 as previously mentioned. The net effective area on valve land 142 on which the governor pressure is caused to act is equal to the difference in the diameters of valve land 152 and sealing surface 146.

When the valve member 142 moves radially inward to a sufficient degree, valve chamber 148 is brought into fluid communication with the external exhaust region through the passage created by the cooperating valve lands 154 and 152. It is thus apparent that a second exhaust flow path is provided for the passage 126, one exhaust flow path being defined in part by cooperating valve lands 128 and 136 and the second being defined in part by the cooperating valve lands 154 and 152. The first exhaust flow path is interrupted during operation in the high speed range since the centrifugal force acting on valve member 132 overcomes the opposed pressure force. Valve member 132 then becomes seated on the valve member 118 and the entire regulation takes place at valve lands 154 and 152.

The introduction of this second exhaust flow path increases the metering capacity of the governor valve mechanism, and the sensitivity of the mechanism to changes in vehicle speed is therefore substantially reduced. During operation at those speeds in excess of 400 r.p.m., the metering characteristics of the governor mechanism can be represented in FIGURE 5 by the portion of the curve between points A and B.

The centrifugal masses that are effective in each range are of a relatively high order of magnitude, and the problems associated with valve sticking are therefore overcome. Further, the use of separate metering valve lands for each range increases the flexibility of the mechanism. The variables such as mass and pressure area for one valve member can be changed without influencing the metering characteristics for the other.

Having thus described a preferred form of my invention, what I claim and desire to secure by United States Letters Patent is:

1. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, a fluid pressure passage extending from said pressure supply passage to said first valve part, and means for distributing fluid pressure from said fluid pressure passage to said second and third valve parts whereby the latter are urged radially inwardly with respect to the axis of rotation of said rotary member by a fluid pressure force, said second and third valve parts being urged radially outwardly under the influence of centrifugal force in opposition to said fluid pressure force, said valve parts having cooperating valve lands which establish a dual exhaust flow path for accommodating a controlled degree of communication between said passage and an exhaust region, the valve land of each valve part engaging and being movable slidably over the valve land of the adjacent valve part, said second and third valve parts being normally urged toward an exhaust flow path interrupting position relative to said first valve part.

2. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said second and third valve parts being urged radially outwardly under the influence of centrifugal force in opposition to said fluid pressure force, a first pair of cooperating valve lands formed on said first and second valve parts for establishing a first exhaust flow path, and a second pair of cooperating valve lands formed on said second and third valve parts for establishing a second exhaust flow path, one valve land of each pair engaging and being movable slidably over the other valve land of that pair, said second and third valve parts being normally urged toward an exhaust flow path interrupting position relative to said first valve part.

3. In a fluid pressure governor for supplying a pressure signal proportional in magnitude to the speed of rotation of a rotary member, said rotary member having a pressure supply passage formed therein, a first valve part carried by said rotary member, a second valve part slidably supported by said first valve part, a third valve part slidably supported by said second valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said second and third valve parts being urged radially outwardly under the influence of centrifugal force in opposition to said fluid pressure force, said valve parts having cooperating valve lands which establish a dual exhaust flow path for accommodating a controlled degree of communication between said passage and an exhaust region, the valve land of each valve part engaging and being movable slidably over the valve land of the adjacent valve part, and spring means for normally urging said third valve part in a radially outward direction, said spring means maintaining said third valve part in a flow interrupting position relative to said second valve part during operation of said governor at speeds less than a precalibrated value, said second and third valve parts being normally urged toward an exhaust flow path interrupting position relative to said first valve part.

4. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said first and second valve parts being urged radially outwardly under the influence of centrifugal force in opposition to said fluid pressure force, a first pair of cooperating valve lands formed on said first and second valve parts for establishing a first exhaust flow path, a second pair of cooperating valve lands formed on said second and third valve parts for establishing a second exhaust flow path, one valve land of each pair engaging and being movable slidably over the other valve land of that pair, and spring means for normally urging said third valve part in a radially outward direction, said spring means maintaining said third valve part in a flow interrupting position relative to said second valve part during operation of said governor at speeds less than a precalibrated value, said second and third valve parts being normally urged toward an exhaust flow path interrupting position relative to said first valve part.

5. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by and telescopically related with respect to said first valve part, a third valve part slidably supported by and telescopically related with respect to said second valve part, said second and third valve parts each being adapted to move radially outward with respect to said first valve part under the influence of centrifugal force during rotation of said rotary member, a fluid pressure passage extending from said pressure supply passage to said first valve part, and means for distributing fluid pressure from said fluid pressure passage to said second and third valve parts whereby the latter are urged radially inwardly with respect to the axis of rotation of said rotary member by fluid pressure forces, said valve parts being urged radially outwardly under the influence of centrifugal force in opposition to said fluid pressure force, said valve parts having cooperating valve lands which establish a dual exhaust flow path for accommodating a controlled degree of communication between said passage and an exhaust region, the valve land of each valve part engaging and being movable slidably over the valve land of the adjacent valve part, said second and third valve parts being normally urged toward an exhaust flow path interrupting position relative to said first valve part.

6. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by and telescopically related with respect to said first valve part, a third valve part slidably supported by and telescopically related with respect to said second valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said first and second valve parts being urged radially outwardly under the influence of centrifugal force in opposition to said fluid pressure force, a first pair of cooperating valve lands formed on said first and second valve parts for establishing a first exhaust flow path, and a second pair of cooperating valve lands formed on said second and third valve parts for establishing a second exhaust flow path, one valve land of each pair engaging and being movable slidably over the other valve land of that pair, said second and third valve parts being normally urged toward an exhaust flow path interrupting position relative to said first valve part.

7. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by and telescopically related with respect to said first valve part, a third valve part slidably supported by and telescopically related with respect to said first valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said second and third valve parts being urged radially outwardly under the influence of centrifugal force in opposition to said fluid pressure force, said valve parts having cooperating valve lands which establish a dual exhaust flow path for accommodating a controlled degree of communication between said passage and an exhaust region, the valve land of each valve part engaging and being movable slidably over the valve land of the adjacent valve part, and spring means for normally urging said third part in a radially outward direction, said spring means maintaining said third valve part in a flow interruption position relative to said second valve part during operation of said governor at speeds less than a precalibrated value, said second and third valve parts being normally urged toward an exhaust flow path interrupting position relative to said first valve part.

8. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by and telescopically related with respect to said first valve part, a third valve part slidably supported by and telescopically related with respect to said second valve part, a fluid pressure pasasge extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said first and second valve parts being urged radially outwardly under the influence of centrifugal force in opposition to said fluid pressure force, a first pair of cooperating valve lands formed on said first and second valve parts for establishing a first exhaust path, a second pair of cooperating valve lands formed on said second and third valve parts for establishing a second exhaust flow path, one valve land of each pair engaging and being movable slidably over the other valve land of that pair, and spring means for normally urging said third valve part in a radially outwardly direction, said spring means maintaining said third valve part in a flow interrupting position relative to said second valve part during operation of said governor at speeds less than a precalibrated value, said second and third valve parts being normally urged toward an exhaust flow path interrupting position relative to said first valve part.

9. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, said second valve part being telescopically received over said first valve part and said third valve part being telescopically received over said second valve part, said first and second valve parts cooperating to define a first fluid pressure chamber, said second and third valve parts cooperating to define a second fluid pressure chamber, a fluid pressure passage extending from said pressure supply passage to said first valve part, and means for distributing fluid pressure from said fluid pressure passage to each of said first and second fluid pressure chambers whereby said second and third valve parts are urged radially inwardly with respect to the axis of rotation of said rotary member by a fluid pressure force, said second and third valve parts being urged radially outwardly under influence of centrifugal force in opposition to said fluid pressure force, the valve land of each valve part engaging and being movable slidably over the valve land of the adjacent valve part, said first and second valve parts having cooperating valve lands adapted to establish a controlled degree of communication between said first fluid pressure chamber and an exhaust region, said second and third valve parts having other cooperating valve lands adapted to establish a controlled degree of communication between said second fluid pressure passage and said exhaust region, the cooperating valve lands being normally adjusted to a fluid flow interrupting position under the influence of centrifugal force.

10. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, said second valve part being telescopically received over said first valve part and said third valve part being telescopically received over said second valve part, said first and second valve parts cooperating to define a first fluid pressure chamber, said second and third valve parts cooperating to define a second fluid pressure chamber, a fluid pressure passage extending from said pressure supply passage to said first valve part, means for distributing fluid pressure from said fluid pressure passage to each of said first and second fluid pressure chambers whereby said second and third valve parts are urged radially inwardly with respect to the axis of rotation of said rotary member by a fluid pressure force, said second and third valve parts being urged radially outwardly under influence of centrifugal force in opposition to said fluid pressure force, said first and second valve parts having cooperating valve lands adapted to establish a controlled degree of communication between said first fluid pressure chamber and an exhaust region, said second and third valve parts having other cooperating valve lands adapted to establish a controlled degree of communication between said second fluid pressure passage and said exhaust region, the valve land of each valve part engaging and being movable slidably over the valve land of the adjacent valve part, the cooperating valve lands being normally adjusted to a fluid flow interrupting position under the influence of centrifugal force, and spring means acting on said second valve part for normally urging the same in a radially outward direction whereby communication between said second fluid pressure chamber and said exhaust region is interrupted at low speeds of rotation of said rotary member.

11. In a fluid pressure governor for supplying a fluid pressure signal proportional in magnitude to the speed of rotation of a rotary member, said rotary member having a pressure supply pasasge formed therein, a first valve part carried by said rotary member and extending radially therefrom, a second valve part slidably supported by and telescopically received over said first valve part, a third valve part slidably supported by and telescopically received over said second valve part, said first and second valve parts cooperating to define a first fluid pressure chamber, said second and third valve parts cooperating to define a second fluid pressure chamber, a fluid pressure passage extending from said pressure supply passage to said first valve part, a precalibrated flow restricting orifice situated in said fluid pressure passage on the upstream side of said first valve part, and means for distributing fluid pressure from said fluid pressure passage to each of said first and second fluid pressure chambers whereby said second and third valve parts are urged radially inwardly with respect to the axis of rotation of said rotary member by a fluid pressure force, said second and third valve parts being urged radially outwardly under influence of centrifugal force in opposition to said fluid pressure force, said first and second valve parts having cooperating valve lands adapted to establish a controlled degree of communication between said first fluid pressure chamber and an exhaust region, said second and third valve parts having other cooperating valve lands adapted to establish a controlled degree of communication between said second fluid pressure passage and said exhaust region, one valve land of each pair engaging and being movable slidably over the other valve land of that pair, the cooperating valve lands being normally adjusted to a fluid flow interrupting position under the influence of centrifugal force.

12. In a fluid pressure governor for supplying a fluid pressure signal proportional in magnitude to the speed of rotation of a rotary member, said rotary member having a pressure supply passage formed therein, a first valve part carried by said rotary member and extending radially therefrom, a second valve part slidably supported by and telescopically received over said first valve part, a third valve part slidably supported by and telescopically received over said second valve part, said first and second valve parts cooperating to define a first fluid pressure chamber, said second and third valve parts cooperating to define a second fluid pressure chamber, a fluid pressure passage extending from said pressure supply passage to said first valve part, a precalibrated flow restricting orifice situated in said fluid pressure passage on the upstream side of said first valve part, means for distributing fluid pressure from said fluid pressure passage to each of said first and second fluid pressure chambers whereby said second and third valve parts are urged radially inwardly with respect to the axis of rotation of said rotary member by a fluid pressure force, said second and third valve parts being urged radially outwardly under influence of centrifugal force in opposition to said fluid pressure force, said first and second valve parts having cooperating valve lands adapted to establish a controlled degree of communication between said first fluid pressure chamber and an exhaust region, said second and third valve parts having other cooperating valve lands adapted to establish a controlled degree of communication between said second fluid pressure passage and said exhaust region, the valve land of each valve part engaging and being movable slidably over the valve land of the adjacent valve part, the cooperating valve lands being normally adjusted to a fluid flow interrupting position under the influence of centrifugal force, and spring means acting on said second valve part for normally urging the same in a radially outward direction whereby communication between said second fluid pressure chamber and said exhaust region is interrupted at low speeds of rotation of said rotary member.

13. In a fluid pressure governor for supplying a pressure signal proportional in magnitude to the speed of rotation of a rotary member, said rotary member having a pressure supply passage formed therein, a first valve part carried by said rotary member and extending radially therefrom, a second valve part slidably supported by said first valve part, a third valve part slidably supported by said second valve part, a fluid pressure passage extending from said pressure supply passage to said first valve part, means for distributing fluid pressure from said fluid pressure passage to said second and third valve parts whereby the latter are urged radially inwardly with respect to the axis of rotation of said rotary member by a fluid pressure force, said first and second valve parts being urged radially outwardly under the influence of centrifugal force in opposition to said fluid pressure force, a first pair of cooperating valve lands formed on said first and second valve parts for establishing a first exhaust flow path, and a second pair of cooperating valve lands formed on said second and third valve parts for establishing a second exhaust flow path, one valve land of each pair engaging and being movable slidably over the other valve land of that pair, said second and third valve parts being normally urged toward an exhaust flow path interrupting position relative to said first valve part, said fluid pressure distributing means including a precalibrated flow restricting orifice situated on the upstream side of said valve parts.

References Cited in the file of this patent

UNITED STATES PATENTS

| | | |
|---|---|---|
| 2,635,617 | Condell | Apr. 21, 1953 |
| 2,697,363 | Sheppard | Dec. 21, 1954 |
| 2,697,441 | Hobbs | Dec. 21, 1954 |
| 2,740,304 | Sheppard | Apr. 3, 1956 |
| 3,049,028 | English | Aug. 14, 1962 |